(12) United States Patent
Xie et al.

(10) Patent No.: US 11,307,997 B2
(45) Date of Patent: Apr. 19, 2022

(54) LOGICAL TO PHYSICAL DATA STORAGE MAPPING

(71) Applicant: Seagate Technology LLC, Fremont, CA (US)

(72) Inventors: Hongmei Xie, Milpitas, CA (US); Zejiang Qu, Rochester, MN (US); Hackbin Kim, Los Altos, CA (US); Erich Franz Haratsch, San Jose, CA (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/909,617

(22) Filed: Jun. 23, 2020

(65) Prior Publication Data
US 2020/0320015 A1    Oct. 8, 2020

Related U.S. Application Data (62) Division of application No. 15/924,620, filed on Mar. 19, 2018, now abandoned.

(51) Int. Cl.
*G06F 12/109* (2016.01)

(52) U.S. Cl.
CPC .... *G06F 12/109* (2013.01); *G06F 2212/1008* (2013.01); *G06F 2212/1016* (2013.01); *G06F 2212/657* (2013.01)

(58) Field of Classification Search
CPC .......... G06F 12/109; G06F 2212/1008; G06F 2212/1016; G06F 2212/657
See application file for complete search history.

(56) References Cited

U.S. PATENT DOCUMENTS

| | | | |
|---|---|---|---|
| 2015/0074327 A1* | 3/2015 | Xu | G06F 12/0253 711/103 |
| 2016/0179400 A1* | 6/2016 | Batra | G06F 9/445 711/154 |
| 2017/0083436 A1* | 3/2017 | Jung | G06F 12/0246 |
| 2018/0088805 A1* | 3/2018 | Kanno | G06F 12/10 |

OTHER PUBLICATIONS

7-Zip Discussion, https://sourceforge.net/p/sevenzip/discussion/45798/thread/d58e601c/?limit=25 (Year: 2015).*

\* cited by examiner

*Primary Examiner* — Michael Krofcheck
(74) *Attorney, Agent, or Firm* — Tayler English Duma, LLP (57) ABSTRACT

Systems, methods and computer-readable memory for garbage collection in a storage device. One method comprises, upon a write of data to a first garbage collection unit (GCU) of the storage device, incrementing a number of logical mapping units stored in the first GCU along with a number of logical mapping units with valid data stored in the first GCU. A number of logical mapping units with invalid data stored in a second GCU is decremented based on the incremented number of logical mapping units with valid data stored in the first GCU. The second GCU is erased when a valid data rate of the second GCU is below a valid data rate of the first GCU.

9 Claims, 12 Drawing Sheets

LOGICAL TO PHYSICAL DATA STORAGE MAPPING

This application is a divisional of U.S. patent application Ser. No. 15/924,620, filed Mar. 19, 2018, which is incorporated herein by reference in its entirety.

SUMMARY

Systems and methods presented herein provide for logical unit mapping to physical mapping units of a data storage device. In one embodiment, a method includes processing an Input/Output (I/O) request to a storage device and extracting a logical mapping unit from the I/O request. The method also includes determining that the I/O request is for variable length data, and accessing a map that links the logical mapping unit to one or more physical addresses of the storage device. The method also includes calculating a number of physical mapping units at the physical addresses to service the I/O request.

The various embodiments disclosed herein may be implemented in a variety of ways as a matter of design choice. For example, the system and method embodiments hereof may take the form of computer hardware, software, firmware, or combinations thereof. Other exemplary embodiments are described below.

BRIEF DESCRIPTION OF THE FIGURES

Some embodiments are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody certain principles that are included within the scope of the embodiments. Furthermore, any examples described herein are intended to aid in understanding the principles of the embodiments and are to be construed as being without limitation to such specifically recited examples and conditions. As a result, the embodiments are not limited to any specific examples described below.

Figure 1:
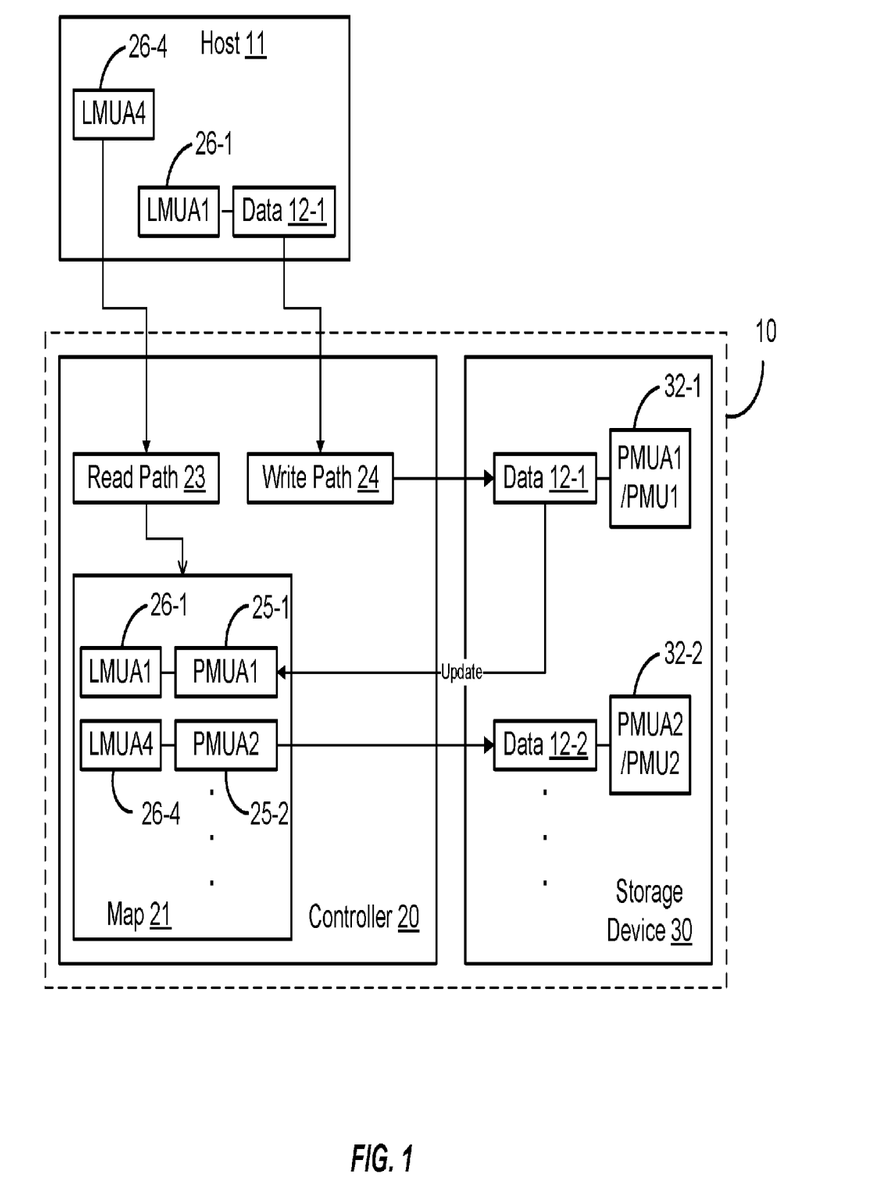
FIG. 1 is a block diagram of an exemplary storage system.

FIG. 1 is a block diagram of an exemplary storage system 10 that is operable to store and read data 12 resulting from I/O requests by a host system 11. The storage system 10 comprises a controller 20 that controls how and where the data 12 is persistently stored on a storage device 30. The controller 20 employs a map 21 that maps data 12 to and from the storage device 30. For example, the host 11 maintains an address list of logical mapping units (LMUs) where data is stored and where data is to be written. These LMUs, however, are not the actual locations for the data 12 in the storage device 30. Rather, logical mapping unit addresses (LMUAs) 26 of the address list are used to link to physical mapping unit addresses (PMUAs) 25 in the map 21 as the controller 20 maintains control over where data 12 is stored and where data 12 is to be written in the storage device 30. This is due to the fact that the controller 20 may need to perform certain operations on the data 12 from time to time, such as garbage collection and data deduplication. So, the controller 20 maintains the map 21 that links the LMUAs 26 of the data 12 to their corresponding PMUAs 25 of the storage device 30, thereby abstracting the physical mapping units (PMUs) of the storage device 30 from the host system 11.

Thus, when the host system 11 needs to read data from the storage device 30, the host system 11 configures a read I/O request that includes a LMUA 26. The host system 11 transfers the read I/O request to the controller 20 where the I/O request goes through a read path 23 to extract the LMUA 26 from the I/O request. The controller 20 processes the LMUA 26 via the map 21 to identify the PMUA 25 of the data 12. In other words, the controller 20 translates the LMUA 26 from the host system 11 to the PMUA 25 using the map 21 to identify which PMU 32 of the storage device 30 storing the data. The controller 20 then uses the PMUA 25 to retrieve the data 12 from the PMU 32 of the storage device 30 and return it to the host system 11.

Similarly, when the host system 11 needs to write data to the storage device 30, the host system 11 configures a write I/O request that includes a LMUA 26 and the data 12 to be written to the storage device 30. The host system 11 transfers the write I/O request to the controller 20 where the I/O request goes through a write path 24 to extract the LMUA 26 and the data 12 from the I/O request. The controller 20 processes the LMUA 26 and writes the data 12 to a PMU 32 of the storage device 30 with a certain address PMUA 25. Once the data is stored, the storage device 30 reports the PMU 32 to the controller 20, which in turn updates the map 21 to link the LMUA 26 to the appropriate PMUA 25 of the PMU 32.

These processes may be used in a variety of storage device types, such as hard disk drives (HDDs) and Solid State Drives (SSDs). SSDs (e.g., NAND flash devices including multi-dimensional NAND flash devices, such as 3D NAND flash devices, etc.) do not use the moving mechanical components that an HDD does. Instead, these storage devices use integrated circuitry as memory cells to persistently store data. The memory cells are arranged in "pages", which are arranged in "blocks". And, the blocks are arranged on a "plane" of a die. The controller 20 in such a case writes data to the pages of the blocks and manages how and where that data is stored and changed via subsequent I/O requests.

In some embodiments, the storage device 30 may be configured using one or more SSD architectures, such as Single Level Cell (SLC) architectures and Multi-Level Cell (MLC) architectures. An SLC architecture allows a memory cell to store one bit of data. Traditionally, an MLC architecture meant that a memory cell could store two bits of data. But, architectures have evolved and now provide even higher levels of density, such as Triple Level Cell (TLC) architectures that store three bits per memory cell, and Quad Level Cell (QLC) architectures that store four bits per memory cell. Generally, though, any architecture storing more than one bit of data per cell may also be referred to as an MLC architecture.

Other examples of the storage device 30 include magnetic recording devices, such as shingled magnetic recording (SMR) mediums where tracks are shingled upon one another to increase data storage capacity. For example, a write head of an SMR drive overlaps tracks of an SMR drive. Thus, when writing to one track of the SMR drive, the write head may disturb the data of an adjacent track. So, the SMR drive marks the disturbed data as invalid and performs a sort of garbage collection on those tracks, similar to an SSD. Still, other examples of the storage device 30 include phase-change memory, resistive Random Access Memory (RAM), magnetoresistive storage devices (e.g., such as magnetoresistive RAM, or "MRAM", Spin-Transfer Torque MRAM, or "STT-MRAM", etc.), and various combinations of the examples herein.

It should be noted that, while the I/O requests can and often do come directly from a host system, the I/O requests may be cached in another device, such as a buffer, before being executed by the controller 20, or may even be issued by other storage devices themselves. Accordingly, the embodiment is not intended to be limited to any particular type of I/O request. Based on the foregoing, the controller 20 is any device, system, software, firmware, or combination thereof operable to service I/O requests to read data from and write data to the storage device 30 and to maintain the integrity of the data in the storage device 30.

Figure 2:
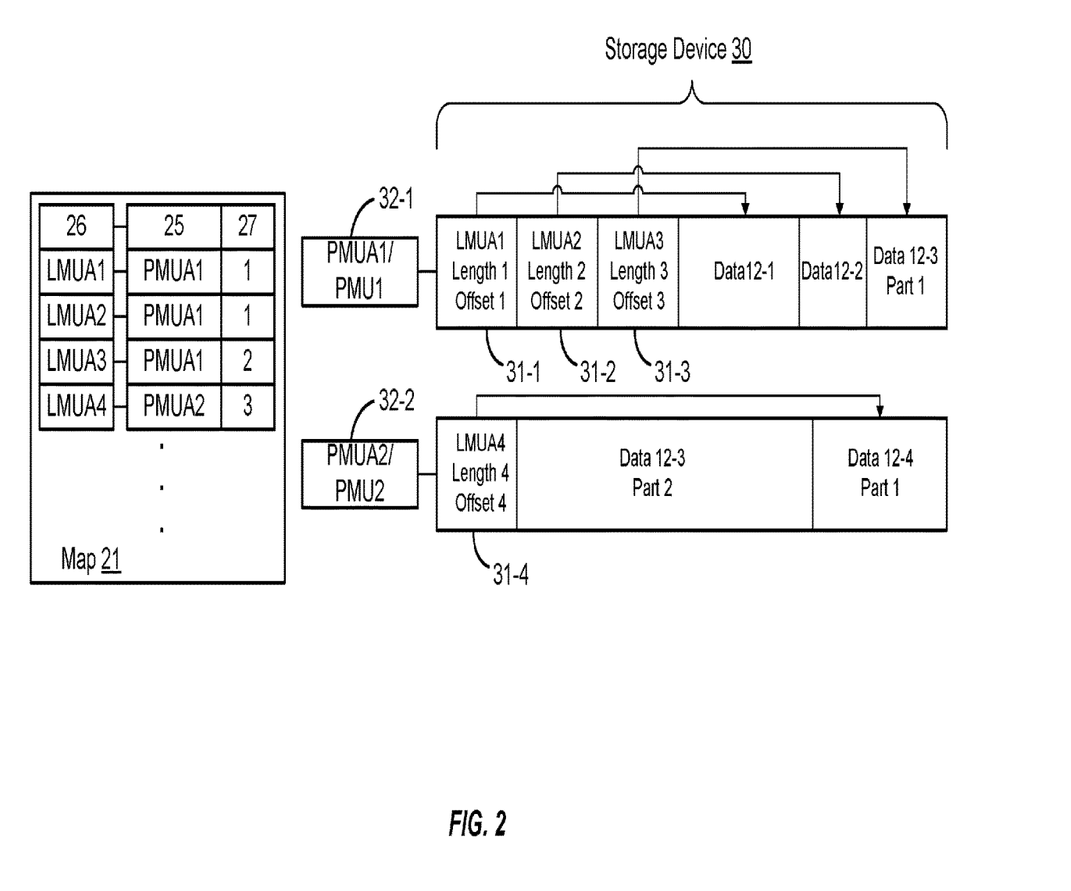
FIG. 2 illustrates an exemplary mapping of logical mapping units to physical mapping units.

FIG. 2 illustrates an exemplary mapping of LMUAs 26 to PMUAs 25. In this embodiment, the data 12 is illustrated as being variable length, although the controller 20 is operable to store both variable length data and fixed length data. For example, some data is compressed to save space within the storage device 30, causing it to be variable in length. Other data 12 has a fixed length, such as 1 kB, 2 kB, 4 kB, 8 kB, and 16 kB, which may correspond to page sizes of an SSD.

Fixed length data is generally easier for the controller 20 to handle because the storage device 30 may be configured to store data in such a manner. For example, in an SSD, each package contains one or more dies (e.g., one, two, or four). The die is generally the smallest unit that can independently execute commands or report status. Each die contains one or more planes (e.g., one or two). Identical and concurrent operations can take place on each plane, although with some restrictions. Each plane contains a number of blocks, which are the smallest unit that can be erased. And, each block contains a number of pages, which are the smallest unit that can be programmed (i.e., written to). Generally, fixed length data corresponds to the page sizes of SSDs (e.g., 1 kB, 2 kB, 4 kB, 8 kB, and 16 kB). So, the controller 20 can tell exactly where data starts and ends by the logical to physical mapping units.

To illustrate, a page of an SSD may have 8 kB of physical storage located at a PMUA 25. That PMUA 25 is linked to a LMUA 26. When fixed length data of 8 kB is stored at the PMUA 25, the data 12 (including any headers, padding, etc.) starts and ends with the PMU 32 that is the physical page of the SSD. So, to access the data 12 at that page, the controller 20 converts the LMUA 26 to the PMUA 25 using the map 21 to retrieve the data 12.

Variable length data, however, presents other challenges because the data 12 may span more than one page and/or even fractions of a page. To illustrate, the data 12-1-data 12-3 are stored at PMU 32-1 (also labeled PMUA1/PMU1) with their headers 31-1-31-3. The headers 31-1-31-3 tell the controller 20 the lengths and offsets of each piece of data 12-1-12-3 at the PMU 32-1 of the storage device 30. The data 12-3, however, is split into two parts with the remaining portion written at the PMU 32-2 (also labeled PMUA2/PMU2). A part of the data 12-4 is also written to the PMU 32-2 along with its header 31-4 with its remainder being written elsewhere (not shown for simplicity).

The map 21 links the LMUAs 26 to the PMUAs 25 and their corresponding PMUs 32 of the storage device 30. The map 21 also includes the number of PMUs (NPMU) 27 that each piece of data 12 occupies. The NPMU, along with the headers 31, allows the controller 20 to know where each piece of data 12 begins and ends. In this example, the LMUA 26-1 pointing to PMUA 25-1 shows it has an NPMU 27 of "1", meaning that all of data for the LMUA 26-1 can be found at the PMU 32-1. The same goes for the data 12-2 associated with LMUA 26-2. The data 12-3 associated with LMUA 26-3, however, has an NPMU of "2" meaning that the data 12-3 spreads over the PMU 32-1 and the PMU 32-2. The data 12-3's header 31-3 shows where the data 12-3 begins (i.e., via the offset) and ends (via the length). Similarly, the data 12-4 associated with LMUA 26-4 has an NPMU of "3" meaning that the data 12-4 spreads across three PMUs 32, with the first part being located at PMU 32-2 (again, the other PMUs 32 not being shown for simplicity).

When the controller 20 needs to retrieve the data 12, the controller 20 processes the LMUA 26, locates the associated header 31, and reads out the data 12 associated with that header 31. To illustrate, when the controller 20 receives a host read request for LMU 26-3, the controller 20 locates the PMUA 26-1, the address of the PMU 32-1 where the data 12-3 is located in the storage device 30. In this instance, the data 12-3 associated with LMUA 26-3 begins at PMUA 32-1 and has an NPMU of "2". The controller 20 then understands that the data 12-3 associated with the LMUA 26-3 spreads across PMUs 32-1 and PMU 32-2. The header 31-3 associated with the data 12-3 will be located in the same PMU 32-1 with the first part of the data 12-3. The controller 20 locates the header 31-3, determines the length of the data 12-3 and its offset in the PMU 32-1 of the storage device 30, and reads out the first part of the data 12-3 in the PMU 32-1. The controller 20, knowing the length of the data 12-3 from the header 31-3, then reads out the remaining portion of the data 12-3 from the PMU 32-2 of the storage device 30 at the address PMUA 26-2.

Generally, the map 21 is stored in Random Access Memory (RAM), such as double data rate (DDR) RAM. The NPMU field 27 in the map 21, when combined with a LDATA field that shows the length of the data 12 (e.g., that may be scaled by some constant) being stored at a PMU 32, increases the size of the map 21 and reduces the amount of mapping that can be cached in the RAM. This, in turn, slows down host I/Os because the entirety of the map 21 cannot be accessed from the RAM. Instead, portions of the map 21 are stored within the slower access storage device 30. In this regard, a new mapping structure for the map 21 is introduced that removes the NPMU and/or the LDATA fields from the map 21 such that more of the map 21 may be stored in RAM.

Figure 3:
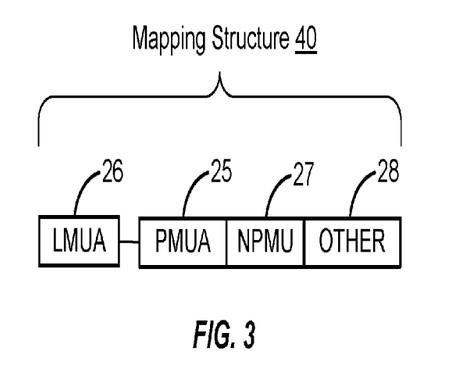
FIGS. 3 and 4 are exemplary mapping structures of the storage system.
Figure 4:
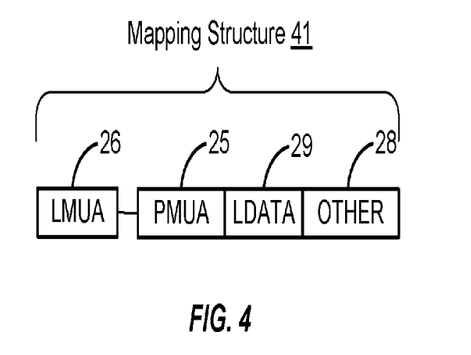

FIGS. 3 and 4 are mapping structures for host I/O requests to the storage device 30. In these embodiments, certain fields are removed from the mapping structure of the map 21 so as to reduce the map size and improve performance of the storage system 10. For example, FIG. 3 illustrates a mapping structure 40 in which the LMUA 26 is linked to the PMUA 25. In the mapping structure 40, the NPMU field 27 and the "other" field 28 are configured in the map 21 without the LDATA field. FIG. 4 illustrates the mapping structure 41 with the LDATA field 29 and the other field 28. Thus, the mapping structure 40 is devoid of the LDATA field 29 and the mapping structure 41 is devoid of the NPMU field 27. By removing these fields from these mapping structures 40 and 41, the size of the map 21 is reduced. However, this information is still needed by the controller 20 to determine the number of PMUs 32 that data 12 is spread across and/or how long the data 12 is. The embodiments below exemplify how this information is still obtained.

For example, during a write operation, the host system 11 may form a write I/O request comprising a LMUA field 26. The LMUA 26 is linked to a PMUA field 25, an NMPU field 27, and an "other" field 28. The write I/O request directs the controller 20 to locate a PMU 32 to store the data 12. After the data is written, the mapping structure 40 is updated in the map 21 with the NPMU field 27 to inform the controller 20 as to how many PMUs 32 of the storage device 30 the data 12 occupies. The other field 28 is used for miscellaneous information pertaining to the data 12 to be stored.

The mapping structure 41 includes the LMUA 26 linking to the PMUA 25 where the data is located. The mapping structure 41 also includes the LDATA field 29 and the other field 28. Missing from this mapping structure 41 is the NPMU field 27. Again, removing this field from the mapping structure 41 reduces the overall size of the map 21. But, the controller 20 still needs to know how many PMUs 32 are being used to store the data 12. In this embodiment, however, the NPMU information can be calculated by the controller 20 on the fly, as will be discussed below.

Figure 5:
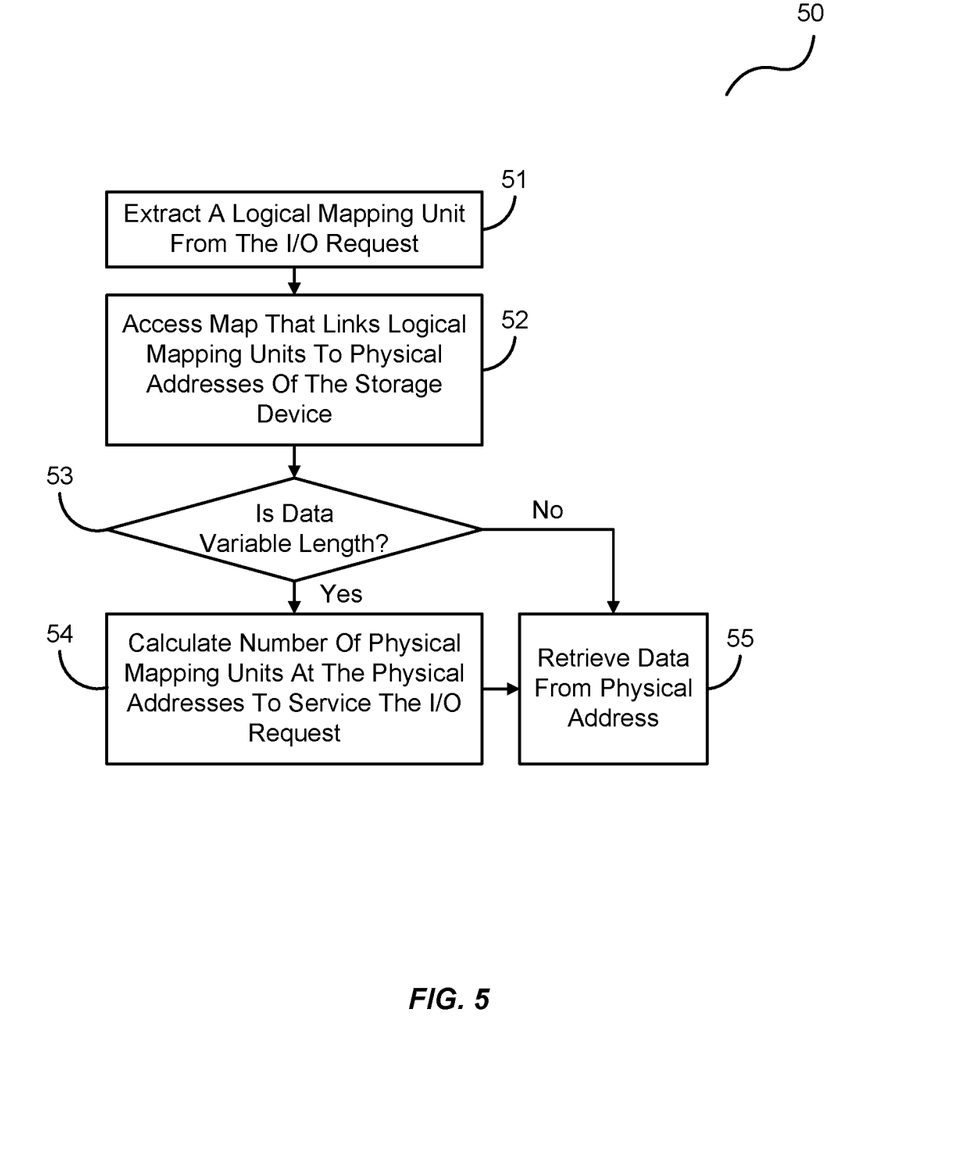
FIG. 5 is a flowchart of an exemplary process of the storage system.

Now, turning to the flowchart of FIG. 5, a process 50 used by the controller 20 is presented. In this embodiment, the controller 20 extracts a LMUA 26 from an I/O request, in the process element 51. Then, the controller 20 accesses the map 21 that links the LMUA 26 to one or more PMUAs 25 of the storage device 30 (e.g., via the mapping structure 41), in the process element 52. The controller 20 then determines whether the data 12 is variable length data, in the process element 53. If so, the controller 20 calculates the NPMU on the fly to determine how many PMUs 32 the data 12 spans in the storage device 30, in the process element 54. From there, the controller 20 locates the data 12 and its associated header 31 to retrieve the data 12 from the PMUs 32 located at the PMUAs 26, in the process element 55. If the data 12 is fixed length data, the controller 20 simply goes to the PMU 32 linked to the LMU 26 via the PMUA 25 to retrieve the data from the PMU 32.

Before delving into the discussion of calculating the NPMU on the fly, a discussion of garbage collection with respect to the mapping structure 40 is presented as new garbage collection procedures are employed with the new mapping structures 40 and 41. Generally, garbage collection is performed on a unit of the physical storage space, called a garbage collection unit (GCU). Two GCUs 60-1 and 60-2 are exemplarily illustrated in FIG. 6. To assist with garbage collection, each GCU 60 maintains some garbage collection statistics (GCSs), such as number of valid data bytes. The controller 20 generally picks the GCU 60 with the smallest GCS for recycling. The embodiments herein provide for updating of the GCSs.

Figure 6:
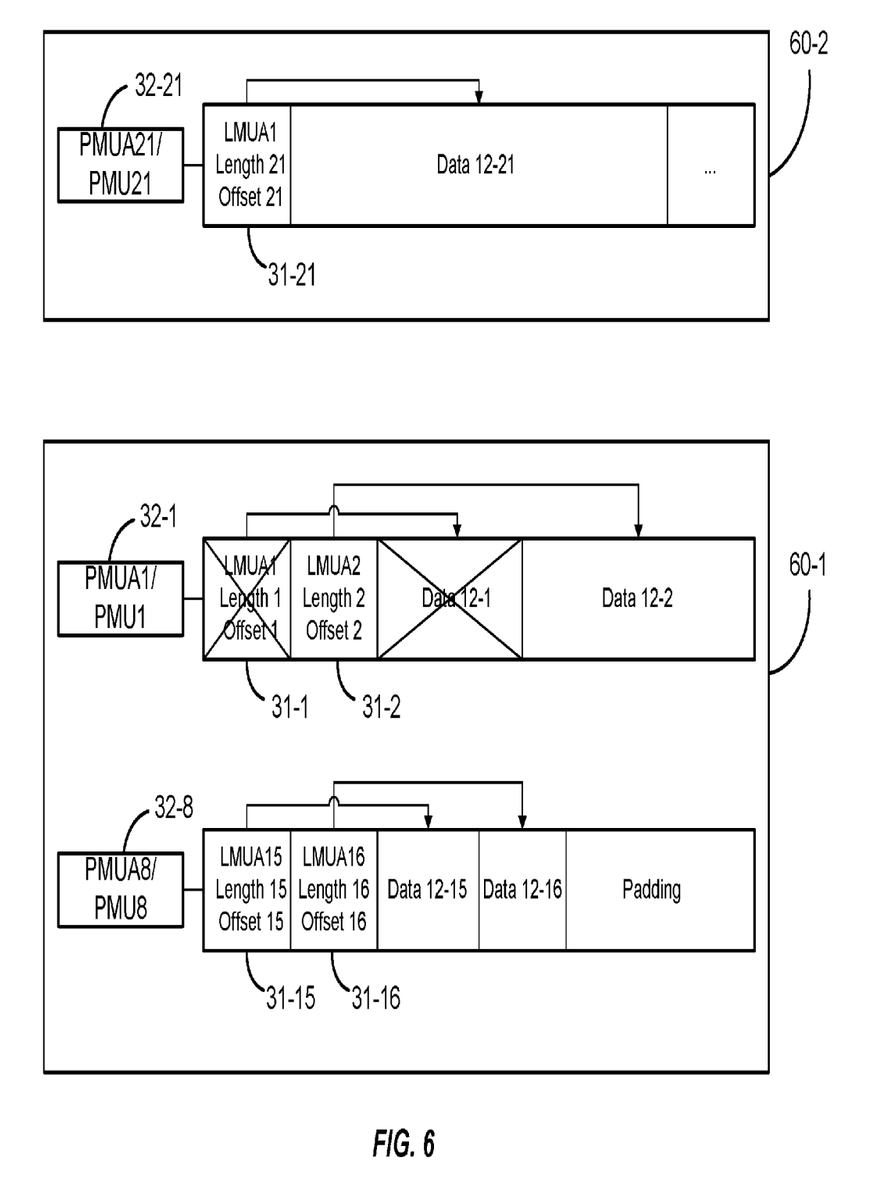
FIG. 6 is a block diagram of exemplary garbage collection units for variable length data of the storage system.

To illustrate, the GCS is updated upon each host write. In steady state, two GCUs 60 (e.g., GCUs 60-1 and 60-2) are involved in GCS updates upon each host write I/O request for a LMUA 26. The GCU 60-2 is where the LMUA 26's new data is written, and the GCU 60-1 is where the LMUA 26's old data resides. With the mapping structure 40, the GCS may take a format of a TLMU-VLMU pair, where TLMU is the total number of LMUAs 26 stored in a GCU 60, and VLMU is the total number of LMUAs 26 with valid data. Naturally, VLMU<=TLMU. Initially VLMU=TLMU=0 for an empty GCU 60, and both values increase by "1" upon every LMUA 26 having its data written to the GCU 60-2 by the controller 20. This invalidates the LMUA 26's old data in the GCU 60-1 (as indicated by the crossing) and the VLMU of the GCU 60-1 thereby decreases by "1".

For example, when the host 11 needs to write the data 12-21 to the GCU 60-2, the VLMU=TLMU=0, initially. And, the GCU 60-1 has a VLMU=TLMU=16, since there are 16 headers (i.e., headers 31-1-31-16) in the GCU 60-1. Then, the controller 20 writes the data 12-21 to the PMU 32-21 in the GCU 60-2, leading to an increment of VLMU=TLMU=1 by the controller 20 for the GCU 60-2. Meanwhile, the LMUA 32-1's old data 12-1 resides in the GCU 60-1. Hence, the controller 20 decreases the VLMU of the GCU 60-1 by 1, from 16 to 15. Note that since the GCU 60-1 is full, the TLMU of the GCU 60-1 is still 16. In the GCU 60-2, the VLMU=TLMU and the controller 20 will keep updating until the GCU 60-2 is full, as shown in the flow chart of FIG. 7.

Figure 7:
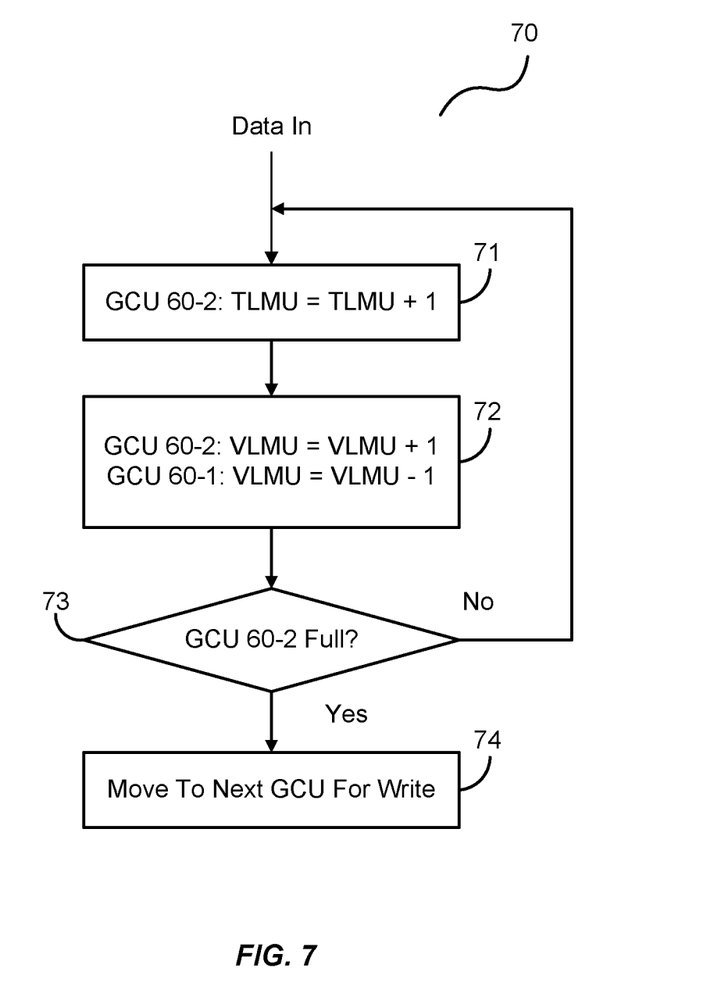
FIG. 7 is a flowchart of another exemplary process of the storage system.

For example, FIG. 7 illustrates a process 70 in which the controller 20 generates the GCS for recycling of the GCUs 60. As data 12 enters the GCU 60-2, the controller 20 increments the TLMU of the GCU 60-2, in the process element 71. Then, the controller 20 increments the VLMU of the GCU 60-2 while decrementing the VLMU of the GCU 60-1, in the process element 72. From there, the controller 20 determines whether the GCU 60-2 is full, in the process element 73. If so, then the controller 20 moves on to the next GCU 60 (e.g., a GCU 60-3) to write data 12, in the process element 74. Otherwise, the controller 20 continues writing to the GCU 60-2 until it is full.

If a LMU 26's old data resides in the same GCU 60 as the new data, the controller 20 will not change the VLMU, but increases the TLMU by only 1.

When recycling starts, the GCS in the format of TLMU-VLMU pair is used to decide which GCU 60 to pick for recycling. For example, a valid data rate RVALID may be calculated as follows:

$$RVALID = VLMU/TLMU.$$

In this regard, the controller 20 picks the GCUs 60 with the lowest values of RVALID for recycling. If two candidate GCUs 60 have the same lowest valued RVALID but different VLMUs or different TLMUs, the controller 20 may pick one GCU 60 at random or choose one that produces some desired results. For example, the GCU 60-1 may have a VLMU1=2, a TLMU1=4, and an RVALID=2/4=½. The GCU 60-2 may have a VLMU2=8, a TLMU2=16, and an RVALID2=8/16=½, which is the same as RVALID1. However, recycling the GCU 60-1 will most likely take less time since there are less TLMUs for a validation check and less VLMUs to move around. When the controller 20 is busy catching up with a write command from the host system 11, or is in urgent need of free space, the controller 20 may choose to recycle the GCU 60-1 first. When the controller 20 is not busy (e.g., such as idling, or when there is still a sufficient amount of free space to serve the host system 11), the controller 20 may choose to recycle the GCU 60-2 first. Similarly, even if a GCU 60 does not have the lowest RVALID but has the smallest VLMU or the smallest TLMU, the controller 20 may still choose to recycle this GCU 60 for a shorter recycling time, to create more new free space, and/or for other performance reasons.

Further, if the original GCS in the format of total number of valid data bytes DVALID, or its scaled version such as a DVALID in unit of 1 kB, is also available, the controller 20 may consider a new garbage collection policy by using both the DVALID and RVALID for performance reasons. For example, if two candidate GCUs have the same lowest RVALID but a different DVALID, the one with the smaller DVALID may be recycled first to reduce overhead from recycling a write.

The idea behind this GCS update by counting is to use a universal compressed data length LCMPD for every LMUA 26 stored in one GCU 60 based on an average compression rate RCMP, if the data 12 has a variable length (e.g., as a result of compression). The RCMP is generally defined as:

RCMP=(TLMU*SLMU)/(TPMU*SPMU), where SLMU is the size of one LMU in bytes, SPMU is the size of one PMU 32 in bytes, TLMU is the total number of LMUAs 26 in one GCU 60, and TPMU is the total number of PMUs 32 in one GCU 60.

Returning to FIG. 6, the TPMU=8 and the TLMU=16 given that the GCU 60-1 is composed of 8 PMUs 32 and contains 16 LMU headers 31 (i.e., the headers 31-1-31-16). Now, assume that the SLMU=SPMU=4 KB, then the RCMP=(16*4 KB)/(8*4 KB)=2. On average, each LMUA 26 has a LCMPD=SLMU/RCMP. In the GCU 60-1, LCMPD=4 KB/2=2 KB. Hence, with the controller 20 reducing the VLMU by 1 in the GCU 60-1, the valid number of bytes is equivalently reduced by 2 kB.

The definition of RCMP indicates its equivalency with the TLMU. Hence, the RCMP-VLMU pair can be used as another format for computing GCS as an alternative to the TLMU-VLMU pair. At any time, the size of valid data LVALID in bytes of each GCU 60 can be calculated on-the-fly as follows:

LVALID=VLMU*SLMU/RCMP.

The controller 20 can then use the LVALID in a garbage collection policy to decide which GCU 60 to pick for recycling (or for other host system 11 usage) using the LVALID alone, or in combination with the VLMU, and/or other real-time performance metrics.

In yet another embodiment of GCS computations, the total valid number of NPMU per GCU 60 (VPMU) can be used in a garbage collection policy. For example, VPMU can be considered as the summation of all NPMU values from the map 21 entries that have their PMUs 32 within a current GCU 60. Each time a LMUA 26 is written to the GCU 60-2, an NPMU of its map entry will be added to the VPMU of the GCS 60-2, while the NPMU of its old map entry will be subtracted from the VPMU of the GCS 60-1, if the old data still resides in the GCU 60-1. When garbage collection starts, the controller 20 will pick the GCU 60 with the smallest VPMU values for recycling. This approach can be viewed as a compressed data length represented in a granularity of the PMUAs 25.

With the mapping structure 41, the LDATA field is retained but the NPMU field is omitted. To accomplish host read I/O requests, the controller 20 calculates an estimate of the NPMU (NPMU-EST) on the fly as follows:

NPMU-EST=LDATA/SPMU-DATA, where SPMU-DATA is the smallest number of data bytes stored in one PMU 32, excluding the size of the headers 31, parity bytes from error correction coding, etc. The controller 20 rounds up the division of LDATA/SPMU-DATA to the closest integer. Hence, NPMU-EST>=NPMU to ensure that all the host 11 data 12 of one LMUA 26 is read out from the storage device 30 upon a host read I/O request. For example, if LDATA=3096 and SPMU-DATA=3000, then NPMU-EST=2.

With the new mapping structures 40 and 41, data deduplication for the storage system 10 is also presented. For example, the mapping structures 40 and 41 are responsible for translating logical block address from the host system 11 to physical block address of the storage device 30. How data is written to the storage device 30 and the dependence on specific components in a data path are generally irrelevant to the mapping structures 40 and 41. But, both compression and deduplication are still part of the data path and may result in different entry values and/or the addition (or deletion) of certain fields in the map 21 when compared to a data path without compression and deduplication. So, a data path with deduplication may reuse the mapping structures 40 and 41 and/or their variants, such as the mapping structures 42 and 43 in FIGS. 12 and 13.

In this embodiment, deduplication removes the data 12 that is a replica to a previous data 12. For example in FIG. 8, host data of the LMUA 26-31 is the data 12-31, while the host data of the LMUA 26-33 is the data 12-33 and contains the same content as the data 12-31. The data 12-33 is a duplicate of the data 12-31, and can be removed to save storage space in the storage device 30. In this case, the LMUA 26-33 is associated with the data 12-31 so that the correct data 12 can be retrieved for the host 11 upon a read request. In these embodiments, such association is established by allowing the LMUA 26-33's header 31-33 to point to the data 12-31 similar to the header 31-31, leading to multiple headers 31 pointing to a same data 12.

Figure 8:
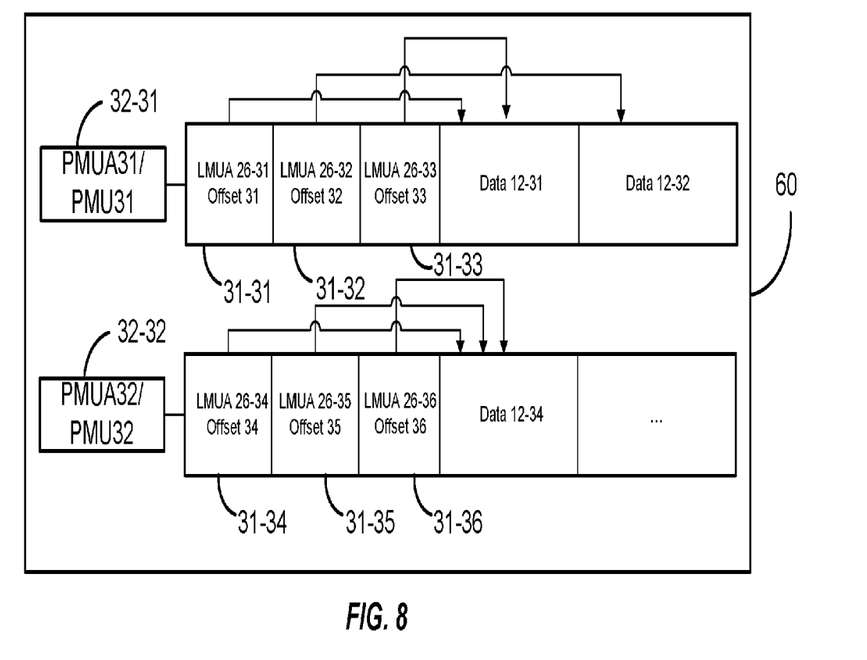
FIG. 8 is a block diagram of an exemplary garbage collection unit for fixed length data of the storage system.

In general, deduplication does not change the size of the host 11's data 12. That is, each piece of data 12 in a PMU 32 has a fixed size SLMU. Thus, the headers 31 for these bodies of data 12 can be implemented without a length field, and their corresponding entries in the map 21 can go without an LDATA field and thus use the mapping structure 40. An example of such is shown in FIG. 8 with the header 31-31, where only the LMUA 26-31 and its offset are recorded for the data 12-31 in the GCU-60-3, which is also pointed to by the LMUA 26-33, stored in the header 31-33 together with its offset. Depending on the size of the PMU 32, the data 12 of one or more LMUAs 26 (e.g., LMUAs 26-31-26-33) may be stored in one PMU 32 (e.g., in PMU 32-31) along with their corresponding headers 31 (e.g., headers 31-31-31-33).

Figure 9:
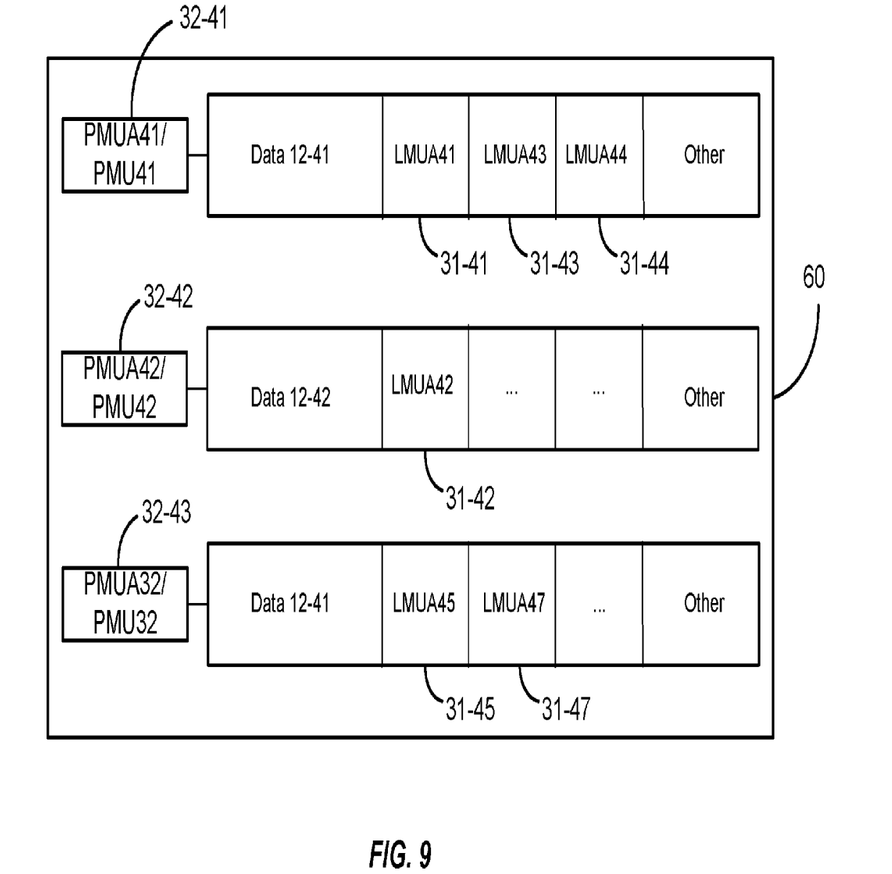
FIG. 9 is a block diagram of another exemplary garbage collection unit for fixed length data of the storage system.

FIG. 9 illustrates smaller PMUs 32 that accommodate one fixed size data 12 but pointed to by multiple headers 31, such as data 12-41 pointed to by header 31-41, header 31-43 and header 31-44. In this case, no offset field is necessary in the headers 31 because the data 12 can be stored with a fixed offset, such as always from the beginning of each PMU 32. As such, only the LMUA 26 field is recorded in the header 31. For example, in the PMU 32-41, only the LMUA 26-41 is recorded in the header 31-41.

In FIG. 9, each PMU 32 of the GCU 60-4 has at most three headers (e.g., headers 31-41-31-44 at PMUA 32-41) due to limited size of the PMU 32. Generally, the controller 20 determines the difference between the size of one PMU 32 and the size of one LMU 26, and then divides it by the size of one header 31 to get the maximum number of headers 31. However, it is usually a good practice to set the number of headers 31 to a smaller number. The reason to limit the number of headers per PMU 32 is that some spare bits should be reserved for logging, error correction parity check, to name a few, as indicated by "Other" field in FIG. 9. As a result, deduplication efficiency can be reduced.

For example, with three headers 31 being used for three LMUAs, there are three LMUAs that are sharing the same data, instead of three different pieces of data, thereby saving two data pieces of space in the storage device 30. In this embodiment, three headers 31 are used as the maximum number of headers 31 allowed by the size of a PMU 32, such that one, two, or even three headers 31 may appear in one PMU 32. The reason that two headers 31 may appear is because there may be only two LMUs having the same data, while a third LMU has a different data (e.g., no longer a duplication), according to host data patterns, which are out of control of the storage device 30.

While any number of headers 31 may be used, a larger number may save more space. For example, if a maximum of five headers 31 are allowed in a PMU 32 and 5 duplicates of the same data 12-41 are seen, then the controller 20 may add the headers 31-45 and 31-47 into the PMU 32-41 as well, saving the entire PMU 31-43 to be used for storing other host data.

With a maximum of three headers 31 in one PMU 32, one header 31-42 appears in the PMU 32-42, and two headers 31-45 and header 31-47 appear in the PMU 32-43. The data 12-41 is stored twice at the PMU 32-41 and PMU 32-43. This is due to the fact that the headers 31-45 and 31-47 cannot be stored at the PMUA 32-41, which already stores three headers 31.

Figure 10:
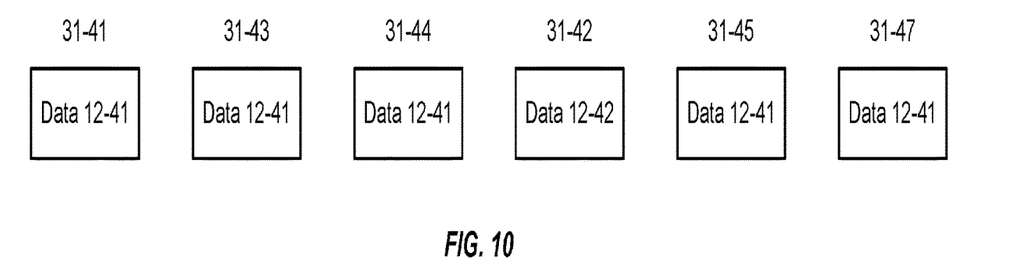
FIGS. 10 and 11 illustrate exemplary orders of logical mapping units of the storage system.
Figure 11:
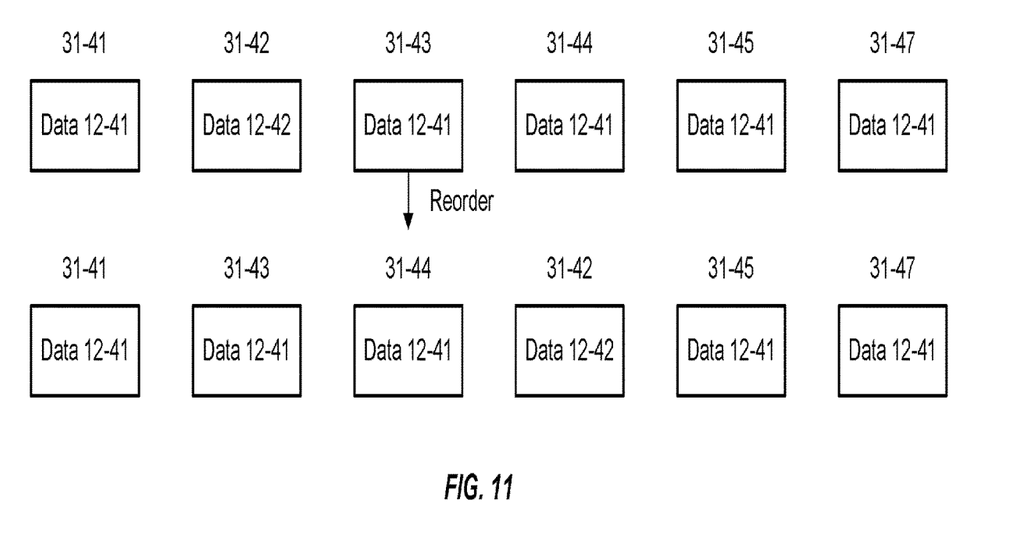

To improve deduplication efficiency in this case, incoming host write I/O requests may be reordered such that duplicates of the data 12 can be grouped together and written into a same PMU 32. To obtain the same amount of data storage as shown in FIG. 9, the host 11's write I/O request sequence can be either in the same order as the data storage (illustrated in FIG. 10) or in a different order (illustrated in FIG. 11) and then later reordered so that LMUAs 26 with the same data 12 are grouped together. For example, in FIG. 11, the LMUA 26-43 with the header 31-43 and the LMUA 26-44 with the header 31-44 are originally behind the LMUA 26-42 with the header 31-42. The LMUA 26-43 and the LMUA 26-44 may be reordered to be ahead of LMUA 26-42 so that they can have their headers 31-43 and 31-44 written in the PMU 32-41 together with the header 31-41 such that all the three point to the piece of data 12-41, thereby achieving deduplication.

Figure 12:
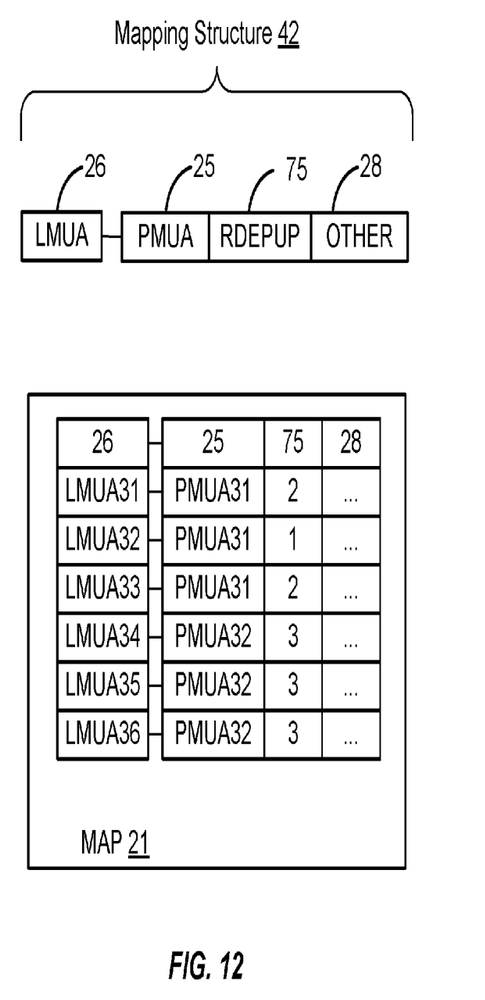
FIGS. 12 and 13 illustrate exemplary data deduplication mapping structures and tables of the storage system.
Figure 13:
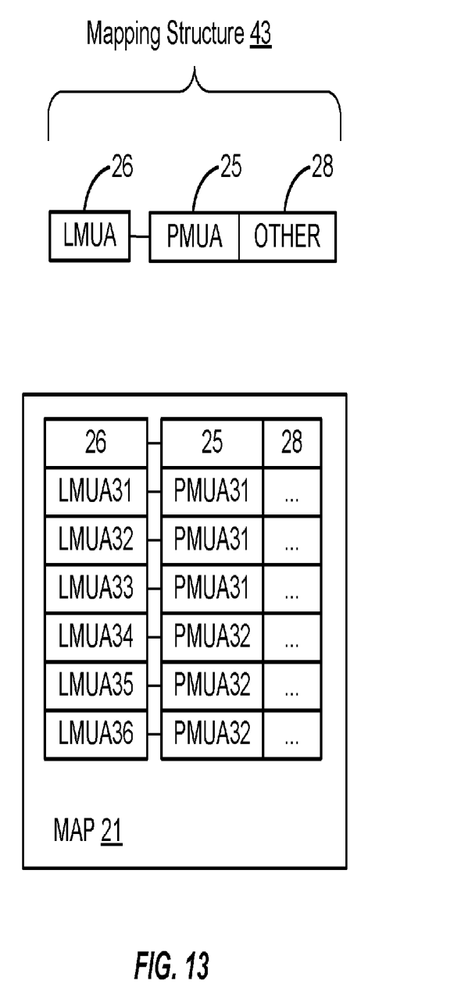

With the new mapping structures 42 and 43 of FIGS. 12 and 13, respectively, two mapping tables for data deduplication are introduced. FIG. 12 illustrates a deduplication mapping using the mapping structure 42. In this embodiment, each LMUA 26 map entry contains a PMUA 25 and a RDEDUP field 75, where the RDEDUP is the number of headers 31 pointing to the LMUA 26's data 12. For example, the data 12-31 at the PMU 32-31 has two headers 31-31 and 31-33 pointing to it, as shown in FIG. 8. Thus, the value of the RDEDUP field at PMUA 25-31 is "2" in the map entry. This indicates that each LMUA 26 has an average length of LDATA=SLMU/RDEDUP, which can be used for a GCS update during a host 11's write I/O.

Alternatively, the controller 20 can record this calculated LDATA in the map entry in place of RDEDUP and use the mapping structure 41 in FIG. 4. For example in FIG. 8, the RDEDUP is "2" for the PMUA 25-31. If the SLMU=4 kB, then an LDATA of 4 kB/2=2 kB, and will replace the RDEDUP of "2" in the field 75 of FIG. 14 for the entries LMUA 31 and PMUA 31. The GCS of the GCU 60 where the PMUA 25-31 resides will then be increased by 2 kB. Again garbage collection chooses the GCU 60 with the smallest GCS to recycle, or uses the GCS in combination with other performance metrics.

In FIG. 13, the deduplication mapping uses the mapping structure 43. In this embodiment, each map entry contains one PMUA 26 field. This is possible because the data 12 written to PMU 32s of FIG. 9 have a fixed size and are each within one PMU 32. In this embodiment, the GCS can take the form of the TLMU-VLMU pair discussed above or of a RCMP-VLUM pair to accomplish garbage collection. RCMP is calculated the same way as discussed above. For example, FIG. 9 shows a TLMU=6 and a TPMU=2. Assuming that the SLMU=SPMU=4 KB, then RCMP=(6*4 KB)/(2*4 KB)=3. This indicates that each LMUA 26 has an LCMPD=SLMU/RCMP=4 kB/3=1.33 kB. Then the controller 20 reduces the valid number of bytes (GCS) in the GCU 60 by 1.33 kB if the LMUA 26-41 updates its data 12 to be different from current data 12-41.

Generally, this is to calculate the LCMPD (e.g., the average length of compressed or deduplicated data). If a latter one of the three LMUAs has its data updated to be different from current data 12-41, part of data 12-41 will become invalid. The GCS in this case reduces by 1.33 kB (e.g., ⅓ of the true length of data 12-41), instead of 4 kB, the true length of data 12-41. This is because two other LMUAs still have data 12-41 as their valid data.

Figure 14:
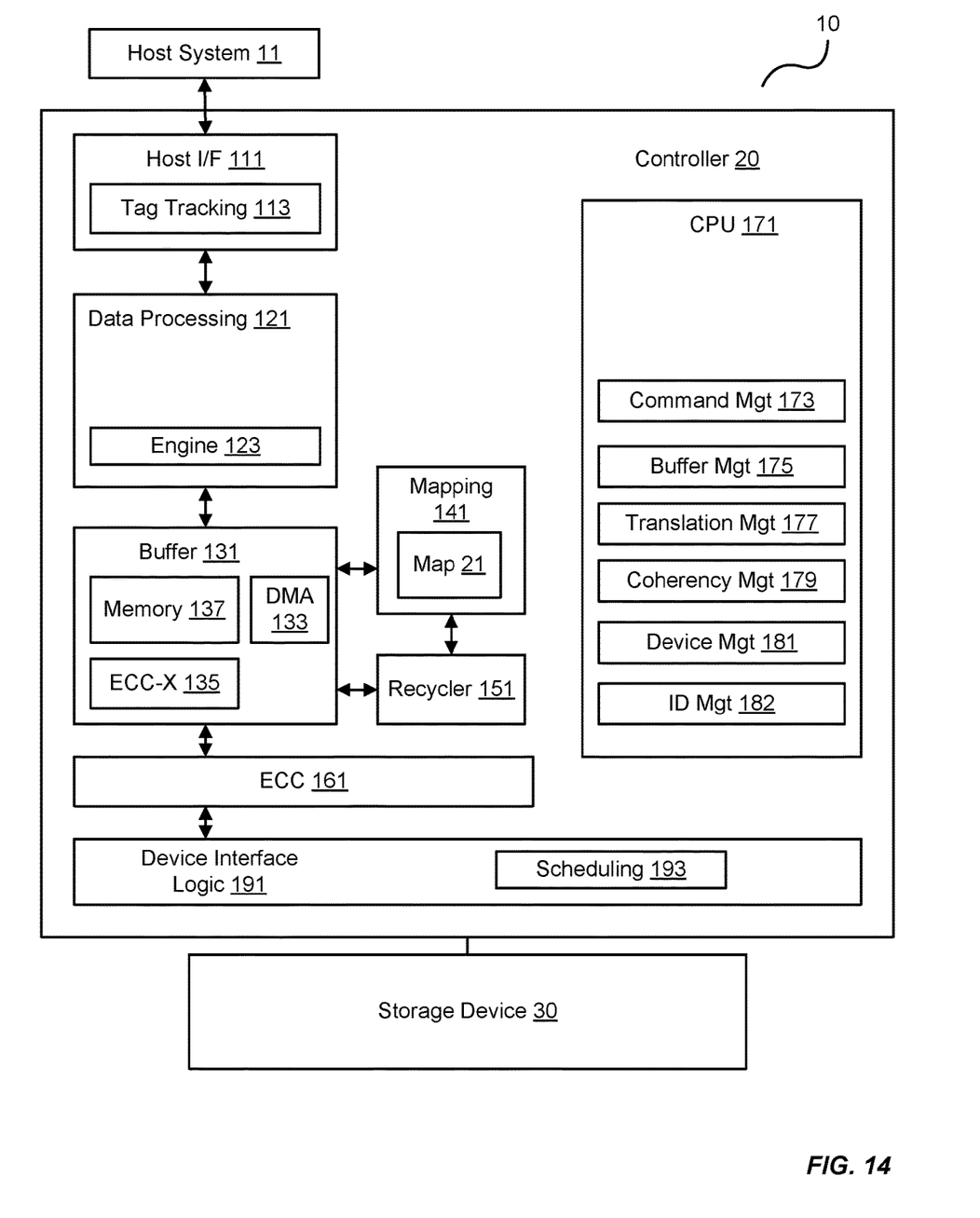
FIG. 14 is a block diagram of an exemplary storage controller and its associated storage device.
Figure 15:
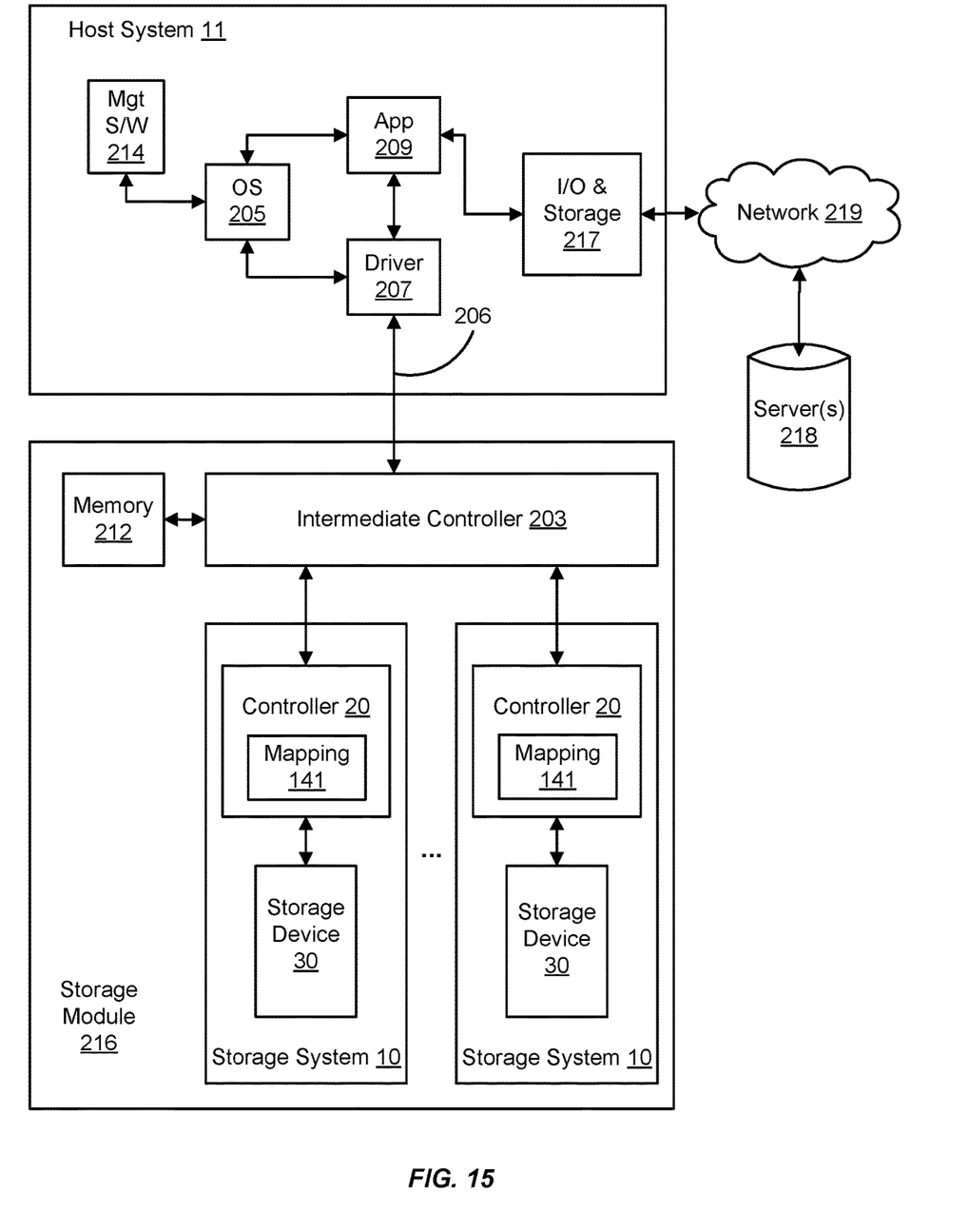
FIG. 15 is a block diagram of an I/O module comprising storage devices and their associated controllers interfacing with a host system.

The embodiments herein can take the form of hardware, firmware, software, or a combination thereof. FIGS. 14 and 15 illustrate such a combination that may be operable to employ the systems and methods described herein. More specifically, FIG. 14 is a block diagram of an exemplary storage system 10 and its associated device controller (e.g., the controller 20) and storage device 30. FIG. 15 is a block diagram of a storage module 216 comprising storage systems 10 and their associated controllers 20/storage devices 30 interfacing with a host system 202.

In FIG. 14, the controller 20 includes a host interface 111 that is operable to interface with a host system to communicate I/O operations of the host system. The host interface 111 may be configured with a tag tracking module 113 that is operable to track progress of individual I/O commands (e.g., read and write commands to certain addresses in the storage device 30). The tag tracking module 113 may associate an external flag of a command received from the host system with an internal flag that the controller 20 can access during processing of the command to identify the status of the processing.

The controller 20 also includes a data processing module 121 that comprises a processing engine 123 generally operable to perform certain tasks on data that is received from the host interface 111 or residing within a buffer 131, such as one or more of formatting the data, transcoding the data, compressing the data, decompressing the data, encrypting the data, decrypting the data, data deduplication, data encoding/formatting, or any combination thereof. For example, a processing engine 123 of the data processing module 121 may be operable to process the I/O operation from an I/O module of the host system generating the operation, such that the data of the I/O operation may be written to the physical address of the storage device 30. The processing engine 123 may extract the data of the write I/O command and prepare it for storage in the storage device 30. In doing so, the processing engine 123 may compress the data using any of a variety of data compression algorithms. When retrieving the data from the storage device 30, the processing engine 123 may decompress the data according to the algorithm used to compress the data for storage.

The buffer 131 is operable to store data transferred to and from the host system 11. The buffer 131 may also store system data, such as memory tables used by the controller 20 to manage the storage device 30, and any possible higher-level RAID functionality in the memory 137. Other modules may include an error correcting code (ECC-X) module 135 to provide higher-level error correction and redundancy functionality, and a Direct Memory Access (DMA) module 133 to control movement of data to and from the buffer 131.

The controller 20 also includes an error correction code module 161 operable to provide lower level error correction and redundancy processing of the data in the buffer 131 using any of a variety of error correction codes techniques (e.g., cyclic redundancy checks, Hamming codes, low-density parity check coders, etc.).

A device interface logic module 191 is operable to transfer data to and from the storage device 30 according to the protocol of the devices therein. The device interface logic module 191 includes a scheduling module 193 that is operable to queue I/O operations to the storage device 30.

The controller 20 herein also includes a map module 141 that is operable to perform data addressing to locations in the storage device 30 according to the map 21. For example, the map module 141 may use the map 21 to convert logical block addresses (LBAs) from the host system 11 to block/page addresses directed to the storage device 30. The map 21 may be stored in whole or in part in controller 20 and/or in storage device 30. For example, in some embodiments a portion of the map 21 may be non-volatilely cached in RAM of the controller 20.

A recycler 151 performs garbage collection on behalf of the controller 20. For example, the recycler 151 may determine portions of the storage device 30 that are actively in use by scanning the map 21 of the map module 141. In this regard, the recycler 151 may make unused, or "deallocated", portions of the storage device 20 available for writing by erasing the unused portions. The recycler 151 may also move data within the storage device 30 to make larger contiguous portions of the storage device 30 available for writing.

The controller 20 also includes a CPU 171 that controls various aspects of the controller 20. For example, the CPU 171 may process instructions or firmware to implement command management 173 that tracks and controls commands received from the host system. This firmware may also implement buffer management 175 that controls allocation and use of the buffer 131 and translation management 177 or to control the map module 141. The firmware may also employ coherency management 179 to control consistency of data addressing to avoid conflicts such as those that may occur between external data accesses and recycled data accesses. The firmware may also provide device management 181 to control the device interface logic module 191 and identity management 182 to control modification and communication of identity information of components within the controller 11.

In FIG. 15, the host system 11 is operable to process software instructions and perform I/O operations with the storage module 216 to read from and write to one or more storage systems 10. In this regard, the host system 11 may include an operating system 205 that provides the computing environment for the host system 11. A driver 207 is operable to communicate through the link 206 to the storage module 216 to perform the I/O operations with the various storage systems 10 configured therewith.

Like other computing systems, the operating system 205 may be initiated via management software 214 (e.g., Bios software). The host system 11 may also include application software 209 to perform various computing processes on behalf of the host system 11 (e.g., word processing applications, image processing applications, etc.). The host system 11 may also include I/O and storage functionality 217 operable to conduct I/O operations with one or more servers 218 through a communication network 219 (e.g., the Internet, local area networks, wide-area networks, etc.). In this regard, the storage module 216 may act as a cache memory of I/O operations for the host system 11.

The storage module 216 may be configured with an intermediate controller 203 that is operable to switch various I/O operations of the host system 11 to LBAs of the storage systems 10. In this regard, the storage module 216 may include a memory 212 that stores mapping information for the intermediate controller 203 to conduct the I/O operations to the LBAs. The map module 141 of the controller 20 may also be operable to perform data addressing with variable-sized mapping units to locations in the storage device 30 according to the map 21, and convert LBAs from the host system 11 to block/page addresses directed to the storage device 30.

It should be noted that the embodiments disclosed herein are not limited to any type of storage device 30 as such may be implemented in other persistent storage devices, including HDDs, SSDs, magnetoresistive storage devices, or the like.

What is claimed is:

1. A method of garbage collection in a storage device, the method comprising steps of, upon a write of new data associated with a logical mapping unit (LMU) to a first garbage collection unit (GCU):
    incrementing a total number of logical mapping units stored in the first GCU;
    incrementing a number of logical mapping units with valid data stored in the first GCU;
    decrementing a number of logical mapping units with valid data stored in a second GCU, the second GCU containing old data associated with the LMU;
    recycling the second GCU when a valid data rate of the second GCU is below a valid data rate of the first GCU; and
    recycling the second GCU when the valid data rate of the second GCU is equal to the valid data rate of the first GCU and a total number of valid data bytes stored in the second GCU is below a total number of valid data bytes stored in the first GCU.

2. The method of claim 1, further comprising:
    computing an average compression rate of data stored in the second GCU based on a total number of logical mapping units stored in the second GCU, a size of a logical mapping unit, a total number of physical mapping units in the second GCU, and a size of a physical mapping unit;
    computing a universal compressed data length for logical mapping units stored in the second GCU based on the average compression rate; and
    in conjunction with decrementing the number of logical mapping units with valid data stored in the second GCU, reducing the total number of valid data bytes stored in the second GCU by the universal compressed data length.

3. The method of claim 2, wherein computing the universal compressed data length for the second GCU comprises:
dividing the size of a logical mapping unit by the average compression rate.

4. The method of claim 2, further comprising:
computing the total number of valid data bytes stored in the second GCU based on the number of logical mapping units with valid data stored in the second GCU, the size of a logical mapping unit, and the average compression rate.

5. The method of claim 1, wherein the valid data rate of the first and second GCU are computed by dividing the number of logical mapping units with valid data stored in the GCU by the total number of logical mapping units stored in the GCU.

6. A storage system, comprising:
a storage device comprising a plurality of garbage collection units (GCUs); and
a controller comprising a map and operable to, upon a write of new data associated with a logical mapping unit (LMU) to a first GCU,
increment a total number of physical mapping units used to store logical mapping units with valid data in the first GCU based on a number of physical units occupied by the new data from a new map entry associated with the LMU in the map,
decrement a total number of physical mapping units used to store logical mapping units with valid data in a second GCU, the second GCU containing old data associated with the LMU, based on a number of physical units occupied by the old data from an old map entry associated with the LMU in the map, and
recycle the second GCU when the total number of physical mapping units used to store logical mapping units with valid data of the second GCU is below the total number of physical mapping units used to store logical mapping units with valid data of the first GCU.

7. The storage system of claim 6, wherein each map entry in the map contains a length of the data associated with the LMU, and wherein the number of physical units occupied by the data associated with the LMU is computed by dividing the length of the data from the map entry associated with the LMU by a smallest number of data bytes stored in one physical mapping unit.

8. A non-transitory memory storing instructions that, when executed by a processor of a controller associated with a storage device, cause the controller to:
upon a write of new data associated with a logical mapping unit (LMU) a first garbage collection unit (GCU) of the storage device, increment a total number of logical mapping units stored in the first GCU;
increment a number of logical mapping units with valid data stored in the first GCU;
decrement a number of logical mapping units with valid data stored in a second GCU, the second GCU containing old data associated with the LMU;
compute an average compression rate of data stored in the first and second GCUs based on the total number of logical mapping units stored in the GCU, a size of a logical mapping unit, a total number of physical mapping units in the GCU, and a size of a physical mapping unit;
compute a size of valid data bytes stored in the first and second GCUs by multiplying the number of logical mapping units with valid data stored in the GCU by the size of a logical mapping unit and dividing by the average compression rate of data stored in the GCU; and
decide whether to recycle the second GCU based on a comparison of the size of valid data bytes stored in the second GCU and the size of valid data bytes stored in the first GCU.

9. The non-transitory memory of claim 8, wherein deciding to recycle the second GCU is further based a comparison of the number of logical mapping units with valid data stored in the second GCU and the number of logical mapping units with valid data stored in the first GCU.

* * * * *